United States Patent
McKay

(10) Patent No.: US 6,794,850 B2
(45) Date of Patent: Sep. 21, 2004

(54) BATTERY HOLDER AND LASER UNIT INCORPORATING SAME

(75) Inventor: Ian McKay, Woodlands (AU)

(73) Assignee: Mortlach Holdings Pty Ltd, Osborne Park (AT)

( * ) Notice: Subject to any disclaimer, the term of this patent is extended or adjusted under 35 U.S.C. 154(b) by 0 days.

(21) Appl. No.: 10/296,305

(22) PCT Filed: May 21, 2001

(86) PCT No.: PCT/AU01/00587
§ 371 (c)(1),
(2), (4) Date: Nov. 21, 2002

(87) PCT Pub. No.: WO01/90800
PCT Pub. Date: Nov. 29, 2001

(65) Prior Publication Data
US 2003/0164693 A1 Sep. 4, 2003

(30) Foreign Application Priority Data
May 22, 2000 (AU) .............................................. PQ7678

(51) Int. Cl.⁷ ............................... H02J 7/00; F21L 4/04
(52) U.S. Cl. ....................... 320/110; 320/113; 320/114; 362/157; 362/205
(58) Field of Search ................................. 320/103, 107, 320/110, 112, 114, 115; 33/286, 1 H, DIG. 21; 362/205, 204, 208

(56) References Cited

U.S. PATENT DOCUMENTS

| | | | |
|---|---|---|---|
| 3,643,083 A | * 2/1972 | Heine | 320/135 |
| 4,032,773 A | * 6/1977 | Halliday, Jr. et al. | 362/157 |
| 4,151,583 A | * 4/1979 | Miller | 362/205 |
| 5,561,911 A | 10/1996 | Martin | 33/365 |
| 5,685,636 A | 11/1997 | German | 362/259 |
| 5,784,792 A | 7/1998 | Smith | 33/227 |
| 5,803,582 A | 9/1998 | Huang | 362/109 |
| 6,142,650 A | 11/2000 | Brown et al. | 362/259 |
| 6,457,246 B1 | * 10/2002 | Frazer et al. | 33/286 |

FOREIGN PATENT DOCUMENTS

| | | |
|---|---|---|
| CA | 2100689 A1 | 1/1994 |
| WO | WO 99/39079 A | 8/1999 |

* cited by examiner

*Primary Examiner*—Pia Tibbits
(74) *Attorney, Agent, or Firm*—Pearne & Gordon LLP

(57) ABSTRACT

Battery holder 10 includes a housing 12 with a recess 14 for receiving a battery 16. The housing 12 supports a first electrical contact 18, a second electrical contact 20 and a third electrical contact 22. First contact 18 makes electrical contact with a first terminal 24 of the battery 16. The second electrical contact 20 is at an opposite end of the housing 12 and makes electrical contact with second terminal 26 of battery 16. The third electrical contact 22 does not make direct contact with the battery 16. Rather, contact 22 is in electrical contact with one end of a switch 28 supported by the housing 12. Switch 12 is in the form of an elongated strip 30 of electrically conductive material seated in and along a groove 31 formed on an outer surface of the body 12, and is provided with an upstanding finger or tang 32. Switch 28 is selectively switchable between an OFF state in which finger 32 is spaced from contact 18, and an ON state where the finger 32 contacts the contact 18, effectively placing contact 22 in electrical contact with terminal 24 of battery 16.

15 Claims, 4 Drawing Sheets

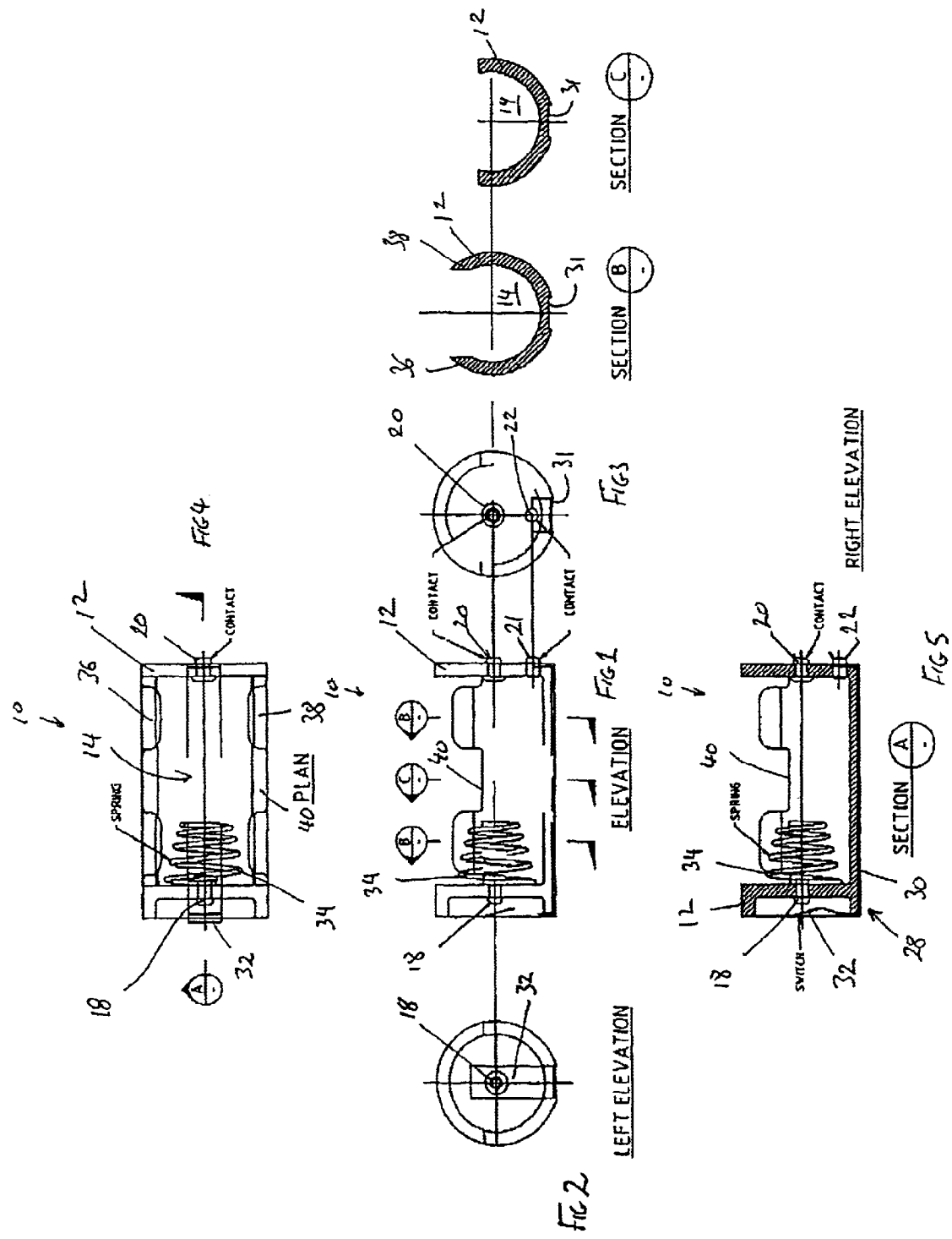

BATTERY HOLDER AND LASER UNIT INCORPORATING SAME

This application was published in English on Nov. 29, 2001 as International Publication Number WO 01/90800.

FIELD OF THE INVENTION

The present invention relates to a battery holder and, to a laser unit incorporating said battery holder.

BACKGROUND OF THE INVENTION

The present inventor is a co-inventor of invention subject of U.S. Pat. No. 6,457,246 which describes a Laser Survey Apparatus typically in use for controlling or regulating the grade or alignment of tunnels in underground mining. The apparatus includes a sleeve that is grouted into a wall and a separate laser unit that can be selectively engaged and disengaged from the sleeve. The laser unit and sleeve co-operate so that when the laser unit is inserted into the sleeve it is automatically switched ON, and when withdrawn from the sleeve it is automatically switched OFF.

The laser unit includes a two-part body having a cylindrical portion and a shaft portion that can be screwed together. The cylindrical portion defines a cavity in which a battery and a laser module are housed. An electrical circuit for delivering an electric current from the battery to the laser module includes the cylindrical portion itself of the body.

When the battery in the apparatus runs flat the body is opened, the flat battery removed and a fresh battery inserted. The body of the apparatus is made from precision engineered metallic (ie electrically conductive) material. While the survey apparatus has found wide spread acceptance in the field problems arise from time to time if the body, and in particular the shaft becomes damaged. If the shaft becomes damaged it may not be received by the sleeve therefore making the laser unit unusable. While the sleeve portion can be replaced, due to the remote locations at which the apparatus is often used and the cost of the precision engineered shaft, the cost of repair and return of the apparatus may approach a substantial cost of the apparatus per se.

SUMMARY OF THE INVENTION

The present battery holder and laser unit incorporating same have arisen through developments made in order to overcome the abovementioned problem. While the battery holder was developed as part of the laser unit it can be incorporated in other battery operated devices.

According to a first aspect of the present invention there is provided a battery holder including at least:
 a housing provided with a recess for receiving a battery;
 a first electrical contact supported by the housing for making electrical contact with one terminal of the battery;
 a second electrical contact supported by the housing for making electrical contact with a second terminal of the battery;
 a third electrical contact supported by the housing; and,
 a switch supported by the housing and in electrical contact with said third electrical contact, said switch switchable between an OFF state where the switch is spaced from the first electrical contact and an ON state in which the switch is in electrical contact with the first electrical contact thus placing the third electrical contact in electrical connection with said one terminal of the battery.

According to a further aspect of the present invention there is provided a battery holder including at least:
 a housing provided with a recess for receiving a plurality of batteries;
 means for electrically connecting said batteries in series so that one terminal of one polarity of a first of said batteries is not connected to any other battery and a second terminal of an opposite polarity of a last of said batteries is not connected to any other battery;
 a first electrical contact supported by the housing for making electrical contact with said one terminal of the first of said batteries;
 a second electrical contact supported by the housing for making electrical contact with the second terminal of said last of said batteries;
 a third electrical contact supported by the housing; and,
 a switch supported by the housing and in electrical contact with said third electrical contact, said switch switchable between an OFF state where the switch is spaced from the said first electrical contact and an ON state in which the switch is in electrical contact with the first electrical contact thus placing the third electrical contact in electrical connection with said one terminal of the first of said batteries.

Preferably said switch is biased to the OFF state.

Preferably said switch includes a biased finger which is spaced from the first electrical contact when the switch is in the OFF state, said finger adapted to be pushed against said bias to contact said first electrical contact to change the state of the switch to the ON state.

Preferably said second and third electrical contacts are provided at the same end of said housing.

Preferably said first electrical contact is provided at an opposite end of said housing.

Preferably said housing is made from an electrically insulating material.

Preferably said housing is made from a plastics material.

Preferably said battery holder further includes electrically conductive bias means in electrical contact with the first contact and disposed to contact said first terminal of the battery to bias the second terminal into contact with the second electrical contact.

According to the present invention there is provided a laser unit comprising:
 a body portion defining a cavity;
 a hollow shaft portion extending from the body portion, said shaft portion having a first opening at one end leading to the cavity and a second opening at an opposite end;
 a battery holder in accordance with the first or further aspect of the present invention disposed in the cavity;
 a laser module disposed in the cavity and in electrical contact with the second and third electrical contacts;
 a battery held within the battery holder; and,
 a plunger slidably retained in the shaft, the plunger having one end adapted for abutment with the switch;
whereby, in use, insertion of a member into the second opening of the shaft slides the plunger toward the body actuating the switch to the ON state enabling electrical current to flow from the battery to the laser module.

Preferably said body portion and shaft portion are integrally formed.

Preferably said body portion and shaft portion are made from an electrically insulating material.

Preferably said laser unit includes a permanent sealing means for permanent sealing the cavity at an end of the body distant the shaft portion.

BRIEF DESCRIPTION OF THE DRAWINGS

An embodiment of the present invention will now be described by way of example only with reference to the accompanying drawings in which:

FIG. 1 is an elevation view of a battery holder in accordance with an embodiment of the present invention;

FIG. 2 is a left elevation view of the battery holder;

FIG. 3 is a right elevation view of the battery holder;

FIG. 4 is a plan view of the battery holder;

FIG. 5 is a view of Section A of FIG. 4;

DETAILED DESCRIPTION OF PREFERRED EMBODIMENT

Figure 6:
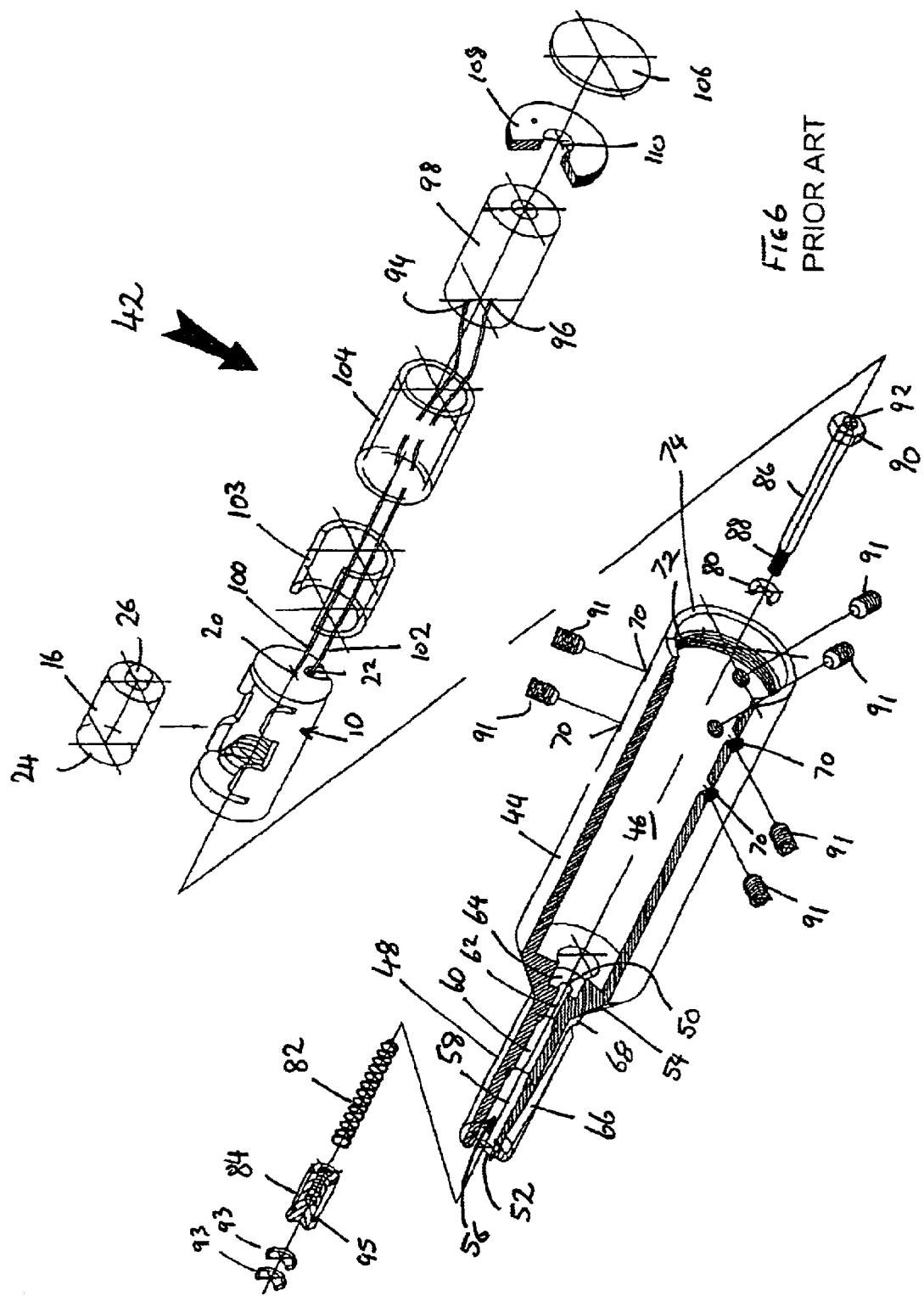
FIG. 6 is a schematic exploded view of a laser unit incorporating a battery holder depicted in FIGS. 1–5.

FIGS. 1–5 depict an embodiment of the battery holder 10. The battery holder 10 includes a housing 12 provided with a recess 14 for receiving a battery 16 (shown in FIG. 6). The housing 12 supports a first electrical contact 18, a second electrical contact 20 and a third electrical contact 22. The first electrical contact 18 is located to make electrical contact with a first terminal 24 (refer to FIG. 6) of the battery 16. The second electrical contact 20 is located on an opposite end of the housing 12 and is positioned to make electrical contact with a second terminal 26 of the battery 16. The third electrical contact 22 does not make direct contact with the battery 16. Rather, the contact 22 is in electrical contact with one end of a switch 28 which is supported by the housing 12. The switch 28 is in the form of an elongated strip 30 of electrically conductive material, that is seated in and extends along a groove 31 formed on outer surface of the body 12, and is provided with an upstanding finger or tang 32. The switch 28 is selectively switchable between an OFF state in which the switch, and in particular the finger 32, is spaced from the first contact 18; and, an ON state where the switch 28, and more particularly the finger 32, is in contact with the first contact 18. In the ON state the switch 28 places the contact 22 in electrical contact with the first contact 18 and thus with the terminal 24 of the battery 16. The switch 28 is normally biased to the OFF state so that the finger 32 is spaced from the contact 18. Switch 28 is switched to the ON state by pushing the finger 32 against the bias onto the contact 18. The bias is provided by the resilience of the material from which the strip 30 is made. In effect, the holder 10 acts to reposition the battery terminals 24 and 26 onto the same end of the battery 16 when the switch 28 is in the ON state.

A conical conductive spring 34 is also attached to the contact 18 on the inside of the recess 14. The spring 34 makes electrical contact with the terminal 24 of the battery 16 and also acts to bias the terminal 26 of battery 16 into contact with the electrical contact 20.

Opposite sides 36 and 38 of the housing 12 are curved inwardly towards each other so that the housing 12 receives the battery 16 with a snap fit. A cutout 40 is formed midway along the length of each side 36 and 38 to allow manual gripping of the battery 16 when in the cavity 14 for the purposes of removing the battery.

It is envisaged that the housing 12 be made from an electrical insulating material and in particular a plastics material. While it is possible to make the housing 12 from an electrically conductive material this would then necessitate the inclusion of insulators in order to electrically isolate the contacts 20, 22 and 18 from each other. This would increase the manufacturing costs of the holder 10 and is not a preferred option.

FIG. 6 illustrates a laser unit 42 in which the battery holder 10 is incorporated. The laser unit 42 includes a body portion 44 defining a cavity 46 and a hollow shaft portion 48 extending from the body 44. The shaft 48 has an opening 50 at one end leading into the cavity 46 and an opening 52 at an opposite end. A conically tapered portion 54 is provided between the body 44 and the shaft 48 to accommodate the reduction in outer diameter between the body 44 and shaft 48.

An axially extending passage 56 formed in the shaft 48 has a progressively reduced down inner diameter. In particular the passage 56 has a first length 58 distant the body 44 having a maximum inner diameter, a second length 60 of reduced but constant diameter and a third length 62 of constant but further reduced diameter. The reduction in diameter between lengths 58 and 60, and 60 and 62 is a tapered reduction rather than a stepped reduction. Leading from the third length 62 into the cavity 46 in the tapered portion 54 is a cavity 64. The cavity 64 has an inner diameter which increases in a step-wise fashion in comparison to the inner diameter of the third length 62 of passage 56.

A groove 66 is formed along an outer surface of the shaft 48. The groove 66 terminates at an end near the conical portion 54 with a short circumferentially extending portion 68. The groove 66 is provided to enable releasable locking of the laser unit 42 in a sleeve of the type depicted and described in U.S. Pat. No. 6,457,246.

Six radially extending tapped holes 70 are formed through the body 44. The holes 70 are provided in two circumferential banks of three holes equally spaced about the body 44.

A screw thread 72 is formed on an inner circumferential surface of body portion 44 between the axially outer-most bank of holes 70 and axial end 74 of the body 44 distant to each shaft 48.

Figure 7:
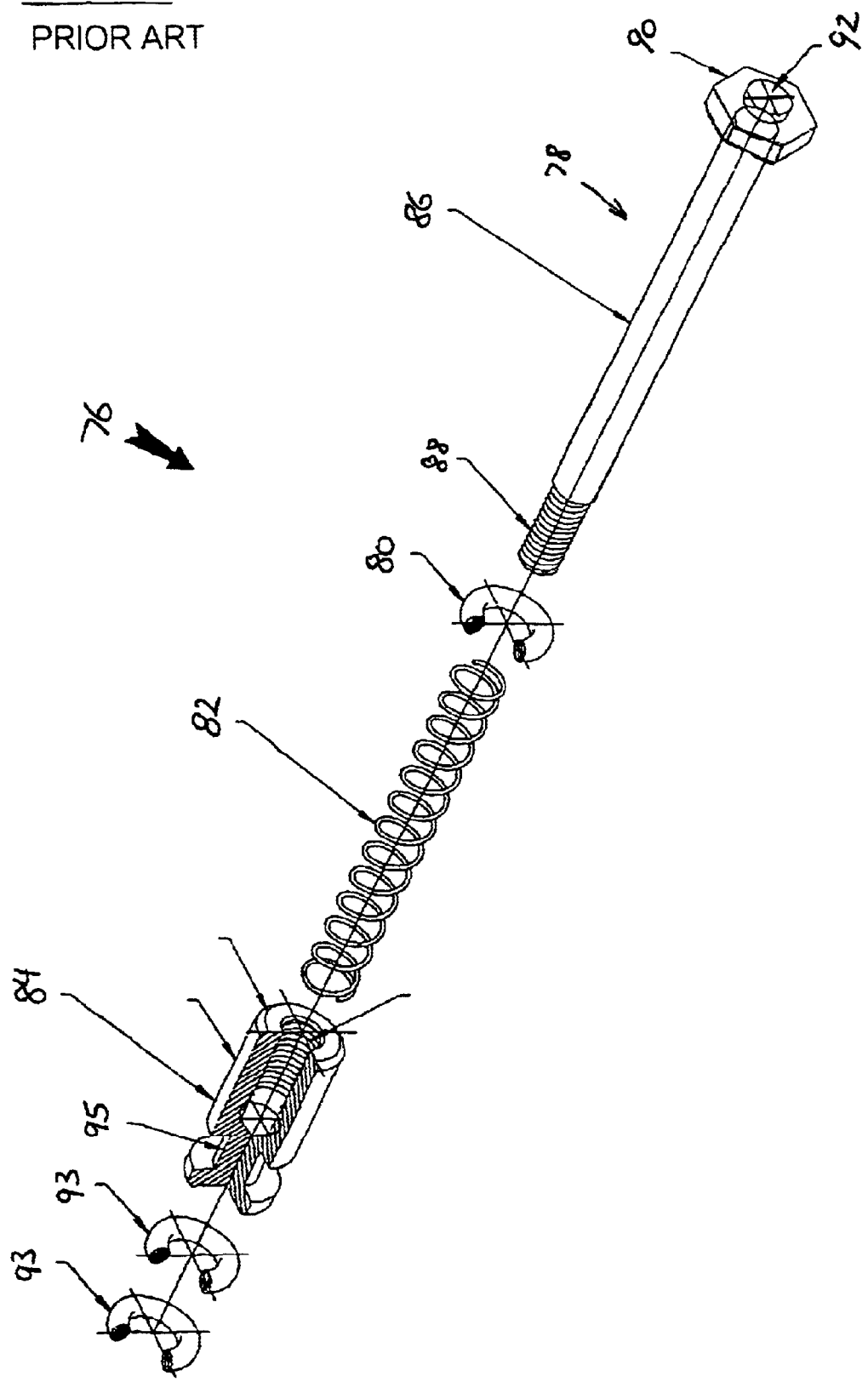
FIG. 7 is a side view of a switch rod and ferrule incorporated in the laser unit depicted in FIG. 6.

A plunger 76 is depicted in explode form in FIG. 7. The plunger includes a switch rod 78, O-ring 80, spring 82, and ferrule 84. The switch rod 78 is in the form of an elongated pin 86 provided with a screw thread 88 at one end and a hexagonal head 90 near, but in board of, an opposite end 92. Two sealing rings 93 sit in a groove 95 formed bout the ferrule 84 (see FIG. 6). The ferrule 84 is substantially cylindrical billet of material having a axially extending blind tapped and threaded hole 85 at one end. When assembling the plunger 76 a laser unit 42, the O-ring is first placed over the pin 86 to abut the head 90 and the switch rod 78 the dropped into the body 44 so that the pin 78 extends through the passage 56 with the head 90 and O-ring 80 residing in cavity 64. The spring 82 is then fed in through the opening 52 and over the pin so as to reside in the second length 60 of the passage 56. Next, the ferrule 84 is passed in through the end 52 and threadingly engaged with the thread 88 at the end of pin 86. The ferrule 84 is dimensioned so that it cannot pass into the second length 60 of the passage 48. The plunger 76 is however dimensioned so that with no force acting on the plunger 76, the ferrule 84 resides in the first length 58 but is spaced a distance from the nearest end of the second length 60.

Next, the battery 16 is snap-fitted into the battery holder 10. Thereafter, electrical terminals 94 and 96 of a laser module 98 are connected by electrical wires 100 and 102 to the contacts 20 and 22 of the battery holder 10. The wires 100, 102 pass through a spacer 103 and a bush 104. The laser module 98 is then inserted into the bush 104 with a snug fit. The assembly of the battery holder 10, spacer 103, bush 104 and laser module 98 is then lowered into the cavity 46 with the battery holder 10 first. The cavity 46 is dimensioned so that the bush 104 extends across the holes 70. Further, the finger 32 of battery holder is disposed so as to lie across the cavity 64 so that it can be acted upon by end 92 of the pin 86. Grub screws 91 are screwed into respective holes 70 to contact the bush 104. By appropriate screwing of the grub screws the laser module 98 can be aligned as required.

The cavity 46 is then closed by a screw cap 108 having a thread about its outer circumferential surface which threadingly engages with the thread 72. It is envisaged that the screw cap 108 be permanently fixed in place so as to prevent the body 44 from being opened. An axially extending hole 110 is formed in the screw cap 108 through which a laser beam from the laser module 106 can pass. A lens 106 is then fitted into the end of body 44 adjacent the screw cap 108 and glued in place.

Figure 8:
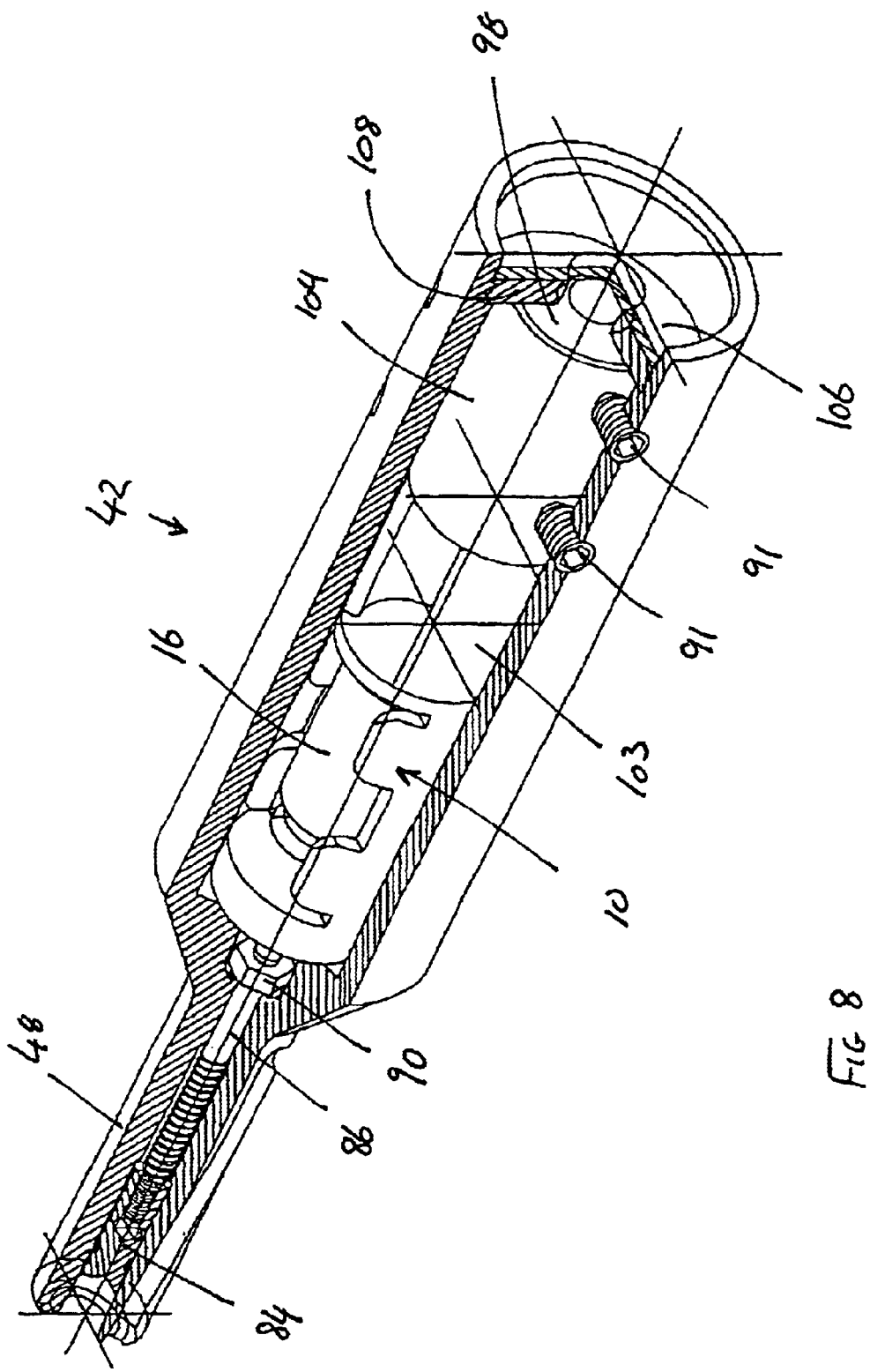
FIG. 8 is a cutaway view of the laser of FIG. 6 in an assembled state.

The fully assembled laser unit 42 is shown in FIG. 8.

Ideally the shaft 48, and body 44 are integrally formed from a non-electrically conductive material and most preferably from a plastics material such as ACETAL. It is further envisaged that the pin 78 and ferrule 84 be made from plastics material. When in use, the laser unit 42 is coupled to a sleeve of a type described in U.S. Pat. No. 6,457,246. This sleeve includes a pin that travels through groove 66 guiding the insertion of the laser unit 42 and finally resides in the portion 68 of the groove to lock the laser unit 42 into the sleeve. Additionally, the sleeve is provided with a member that is configured and positioned so to enter the shaft 48 through opening 52 so as to bear against the ferrule 84 effectively pushing the plunger 76 in a direction toward the body 44. This motion causes the end 92 or pin 86 to push the finger 3 on the battery holder 10 into electrical contact with the first contact 18. As a result an electrical current is able to flow from the battery 16 to the laser module 98 powering the laser module causing it to emit laser beam which passes through hole 110 in the cap 108 and the lens 106.

When the laser unit 42 is disengaged from the sleeve the bias of both the spring 82 and the finger 32 pushes the plunger 78 in a direction away from the body 44 breaking the electrical contact between the finger 32 and contact 18 effectively turning the switch 28 OFF and de-energising the laser module 98 preventing the generation of a laser beam.

It is envisaged that the laser unit 42 will be a disposable unit in that once the battery 16 runs flat the total unit 32 is simply thrown away. Similarly, if the laser unit 42 becomes damaged for example by breakage or other damage to the shaft 48 preventing it from engaging in a sleeve, which as described above is required in order to effectively turn the laser module 98 ON, the laser unit 42 is again simply discarded.

Now that an embodiment of the present invention has been described in detail it will be apparent to those skilled in the relevant arts that numerous modifications and variations may be made without departing from the basic inventive concepts. For example, the present embodiment describes a holder 10 that receives a single battery 16. However, the holder may receive a plurality of batteries that are electrically coupled in series with the exception that one terminal of the first of the batteries is unconnected to any other battery and a second terminal of opposite polarity of the last of the series of connected batteries is left unconnected with any other battery. In this arrangement the one terminal of the first battery would be in electrical contact with the first contact 18 and the second terminal of opposite polarity of the last of the series of connected batteries would be in electrical contact with the second contact 20. The series of connected batteries can either be disposed in the housing in a straight line or arranged side by side. It will be appreciated that a plurality of batteries can also be connected in parallel. However, in such instance the parallel batteries act in effect as a single battery with single opposite terminals. All modifications and variations that would be obvious to a person of ordinary skill in the art are deemed to be within the scope of the present invention the nature of which is to be determined from the above description.

What is claimed is:

1. A battery holder including at least:

a housing having first and second end walls and a recess between said first and second end walls for receiving a battery;

a first electrical tact supported by the first end wall of the housing for making electrical contact with one terminal of the battery;

a second electrical contact supported by the second end wall of the housing for making electrical contact with a second terminal of the battery;

a third electrical contact supported by the second end wall of the housing at a position electrically isolated from direct contact with said battery; and, a switch supported by the housing and in electrical contact with said third electrical contact, said switch switchable between an OFF state where said switch is spaced from the first electrical contact nd an ON state in which said switch is in electrical and mechanical contact with the first electrical contact thus placing the third electrical contact in electrical connection with said one terminal of the battery.

2. A battery holder including at least:

a housing having firs and second end walls and a recess between said first and second end walls for receiving a plurality of batteries;

means for electrically connecting said batteries end to end in series so that one terminal of one polarity of a first of aid batteries is not connected to any other battery and a second terminal of an opposite polarity of a last of said batteries is not connected to any other battery;

a first electrical con supported by the first end wall of the housing for making electrical contact with said one terminal of the first of said batteries;

a second electrical contact supported by the second end wall of the housing for making electrical contact with the second terminal of said last of said batteries;

a third electrical contact supported by the second end wall of the housing at a position electrically isolated from direct contact with said batteries; and, a switch supported by the housing and in electrical contact with said third electrical contact, said switch switchable between an OFF state where said switch is spaced from the said first electrical contact and an ON state in which said switch is in electrical and mechanical contact with the first electrical contact thus placing the third electrical contact in electrical connection with said one terminal of the first of said batteries.

3. A battery holder according to claim 1 wherein said switch is biased to the OFF state.

4. A battery holder according to claim 1 wherein said switch includes a biased finger which is spaced from the first electrical contact when the switch is in the OFF state, said finger adapted to be pushed against said bias to contact said first electrical contact to change the state of the switch to the ON state.

5. A battery holder according to claim 1 wherein said second and third electrical contacts are provided at the same end of said housing.

6. A battery holder according to claim 5 wherein said first electrical contact is provided at an opposite end of said housing.

7. A battery holder according to claim 1 wherein said housing is made from an electrically insulating material.

8. A laser unit comprising:

a body portion defining a cavity;

a hollow shaft portion extending from the body portion, said shaft portion having a first opening at one end leading to the cavity and a second opening at an opposite end;

a battery holder in accordance with any one of claims 1 to 7 disposed in the cavity;

a laser module disposed in the cavity and in electrical contact with the second and third electrical contacts;

a battery held within the battery holder;

a plunger slidably retained in the shaft, the plunger having one end adapted for abutment with the switch; and a sleeve provided with a member adapted to enter said shaft portion through said second opening when said shaft portion is inserted into said sleeve, said member pushing said plunger toward said body portion and switching said switch to said ON state enabling electrical current to flow from the battery to the laser module.

9. A laser unit according to claim 8 wherein said body portion and shaft portion are integrally formed.

10. A laser unit according to claim 8 wherein said body portion and shaft portion are made from an electrically insulating material.

11. A laser unit according to claim 8 further including a permanent sealing means for permanently se ing the cavity at an end of the body distant the shaft portion.

12. A battery holder according to claim 2 wherein said switch is biased to the OFF state.

13. A battery holder according to claim 2 wherein said switch includes a biased finger which is spa d from the first electrical contact when the switch is in the OFF state, said finger adapted to be pushed against said bias to contact said first electrical contact to change the state of the switch to the ON state.

14. A battery holder according to claim 2 wherein said second and third electrical contacts are provided at the same end of said housing.

15. A battery holder according to claim 2 wherein said housing is made from an electrically insulating material.

* * * * *

UNITED STATES PATENT AND TRADEMARK OFFICE
CERTIFICATE OF CORRECTION

PATENT NO. : 6,794,850 B2
DATED : September 21, 2004
INVENTOR(S) : Ian McKay

It is certified that error appears in the above-identified patent and that said Letters Patent is hereby corrected as shown below:

Column 6,
Line 21, please delete "tact" and insert therefor -- contact --.
Line 34, please delete "nd" and insert therefor -- and --.
Line 45, please delete "aid" and insert therefor -- said --.
Line 48, please delete "con" and insert therefor -- contact --.

Column 7,
Line 19, after "and" please insert therefor -- , --.

Column 8,
Line 13, please delete "se ing" and insert therefor -- sealing --.
Line 18, please delete "spa d" and insert therefor -- spaced --.

Signed and Sealed this

Fifteenth Day of February, 2005

JON W. DUDAS
*Director of the United States Patent and Trademark Office*